(12) United States Patent
Bok et al.

(10) Patent No.: US 7,976,066 B2
(45) Date of Patent: Jul. 12, 2011

(54) SEAT BELT PRETENSIONER

(75) Inventors: Chang Kyu Bok, Gwangmyeong-si (KR); Jang Chun Kong, Changwon-si (KR)

(73) Assignees: Hyundai Motor Company, Seoul (KR); Samsong Industries, Ltd., Seoul (KR)

( * ) Notice: Subject to any disclaimer, the term of this patent is extended or adjusted under 35 U.S.C. 154(b) by 65 days.

(21) Appl. No.: 12/465,166

(22) Filed: May 13, 2009

(65) Prior Publication Data

US 2010/0052302 A1    Mar. 4, 2010

(30) Foreign Application Priority Data

Aug. 29, 2008   (KR) .................. 10-2008-0085442

(51) Int. Cl.
*B60R 22/16* (2006.01)
(52) U.S. Cl. .................. 280/806; 297/479; 297/480
(58) Field of Classification Search .................. 280/806; 297/470, 471, 472, 480
See application file for complete search history.

(56) References Cited

U.S. PATENT DOCUMENTS

| | | | | | |
|---|---|---|---|---|---|
| 2,947,353 | A | * | 8/1960 | Von Wimmersperg | 297/470 |
| 3,400,977 | A | * | 9/1968 | Jones | 297/470 |
| 4,015,860 | A | * | 4/1977 | Tisell et al. | 297/480 |
| 4,508,287 | A | * | 4/1985 | Nilsson | 242/374 |
| 5,294,150 | A | * | 3/1994 | Steffens, Jr. | 280/801.2 |
| 5,346,152 | A | * | 9/1994 | Fohl | 242/371 |
| 5,634,690 | A | * | 6/1997 | Watanabe et al. | 297/480 |
| 5,794,978 | A | * | 8/1998 | Nishide | 280/806 |
| 5,887,897 | A | * | 3/1999 | Gill et al. | 280/806 |
| 6,039,353 | A | * | 3/2000 | Bauer et al. | 280/806 |
| 6,068,664 | A | * | 5/2000 | Meyer et al. | 297/480 |
| 6,199,954 | B1 | * | 3/2001 | Holzapfel | 297/479 |
| 6,237,958 | B1 | * | 5/2001 | Patrickson | 280/806 |
| 6,238,003 | B1 | * | 5/2001 | Miller et al. | 297/480 |
| 6,264,281 | B1 | * | 7/2001 | Dukatz et al. | 297/480 |
| 6,340,176 | B1 | * | 1/2002 | Webber et al. | 280/806 |
| 6,382,674 | B1 | * | 5/2002 | Specht et al. | 280/806 |
| 6,419,271 | B1 | * | 7/2002 | Yamada et al. | 280/806 |
| 6,561,936 | B1 | * | 5/2003 | Betz et al. | 474/110 |
| 6,572,147 | B2 | * | 6/2003 | Webber et al. | 280/806 |
| 6,726,250 | B2 | * | 4/2004 | Ennerdal | 280/806 |
| 6,840,544 | B2 | * | 1/2005 | Prentkowski | 280/806 |
| 6,863,308 | B2 | * | 3/2005 | Motozawa | 280/806 |
| 6,866,296 | B2 | * | 3/2005 | Webber et al. | 280/806 |
| 6,874,817 | B2 | * | 4/2005 | Nakayama et al. | 280/805 |
| 6,877,776 | B2 | * | 4/2005 | Ukita et al. | 280/806 |
| 6,902,195 | B2 | * | 6/2005 | Ball et al. | 280/806 |
| 7,172,218 | B2 | * | 2/2007 | Nakano et al. | 280/806 |
| 7,350,734 | B2 | * | 4/2008 | Stevens | 242/374 |

(Continued)

*Primary Examiner* — Paul N Dickson
*Assistant Examiner* — Nicole Verley
(74) *Attorney, Agent, or Firm* — Morgan, Lewis & Bockius LLP (57) ABSTRACT

A seat belt pretensioner may include a cylinder, a piston slidably disposed in the cylinder, a gas generator installed to rear end portion of the cylinder and configured to supply a propellant gas to the piston for moving the piston in a forward direction, a first direction conversion unit disposed between the gas generator and the piston and connected to the cylinder, and a coupling member for coupling a seat belt and the piston, wherein a portion of the coupling member is engaged with the first direction conversion unit so as to change a movement direction of the coupling member while the piston moves in the forward direction, and a reward movement restriction member configured to restrict a rearward movement of the piston while the piston moves in the forward direction by the propellant gas of the gas generator.

17 Claims, 8 Drawing Sheets

U.S. PATENT DOCUMENTS

| | | | |
|---|---|---|---|
| 7,380,832 B2 * | 6/2008 | Gray et al. | 280/806 |
| 7,516,987 B2 * | 4/2009 | Koide et al. | 280/806 |
| 7,533,902 B2 * | 5/2009 | Arnold et al. | 280/806 |
| 7,540,537 B2 * | 6/2009 | Bell | 280/806 |
| 7,631,899 B2 * | 12/2009 | Nakayama et al. | 280/805 |
| 2002/0030396 A1 * | 3/2002 | Stevens | 297/480 |
| 2003/0047931 A1 * | 3/2003 | Rees et al. | 280/806 |
| 2004/0212188 A1 * | 10/2004 | Terasaki | 280/806 |
| 2004/0256850 A1 * | 12/2004 | Yamaguchi | 280/806 |
| 2005/0151365 A1 * | 7/2005 | Nakayama et al. | 280/806 |
| 2006/0279077 A1 * | 12/2006 | Nakano et al. | 280/806 |

* cited by examiner

SEAT BELT PRETENSIONER

CROSS-REFERENCE TO RELATED APPLICATIONS

The present application claims priority to Korean Patent Application No. 10-2008-0085442 filed Aug. 29, 2008, the entire contents of which application is incorporated herein for all purposes by this reference.

BACKGROUND OF THE INVENTION

1. Field of the Invention

The present invention relates to a seat belt pretensioner which can rapidly pull in a length of a seat belt to tighten the seat belt about a vehicle occupant in case of a crash, thereby restraining and protecting the vehicle occupant.

2. Description of Related Art

In case of a crash, a vehicle occupant is moved forward through a substantial distance before a seat belt is locked by a retractor. A seat belt pretensioner functions to tighten the seat belt and protect the vehicle occupant before the forward movement of the vehicle occupant begins.

Figure 1:
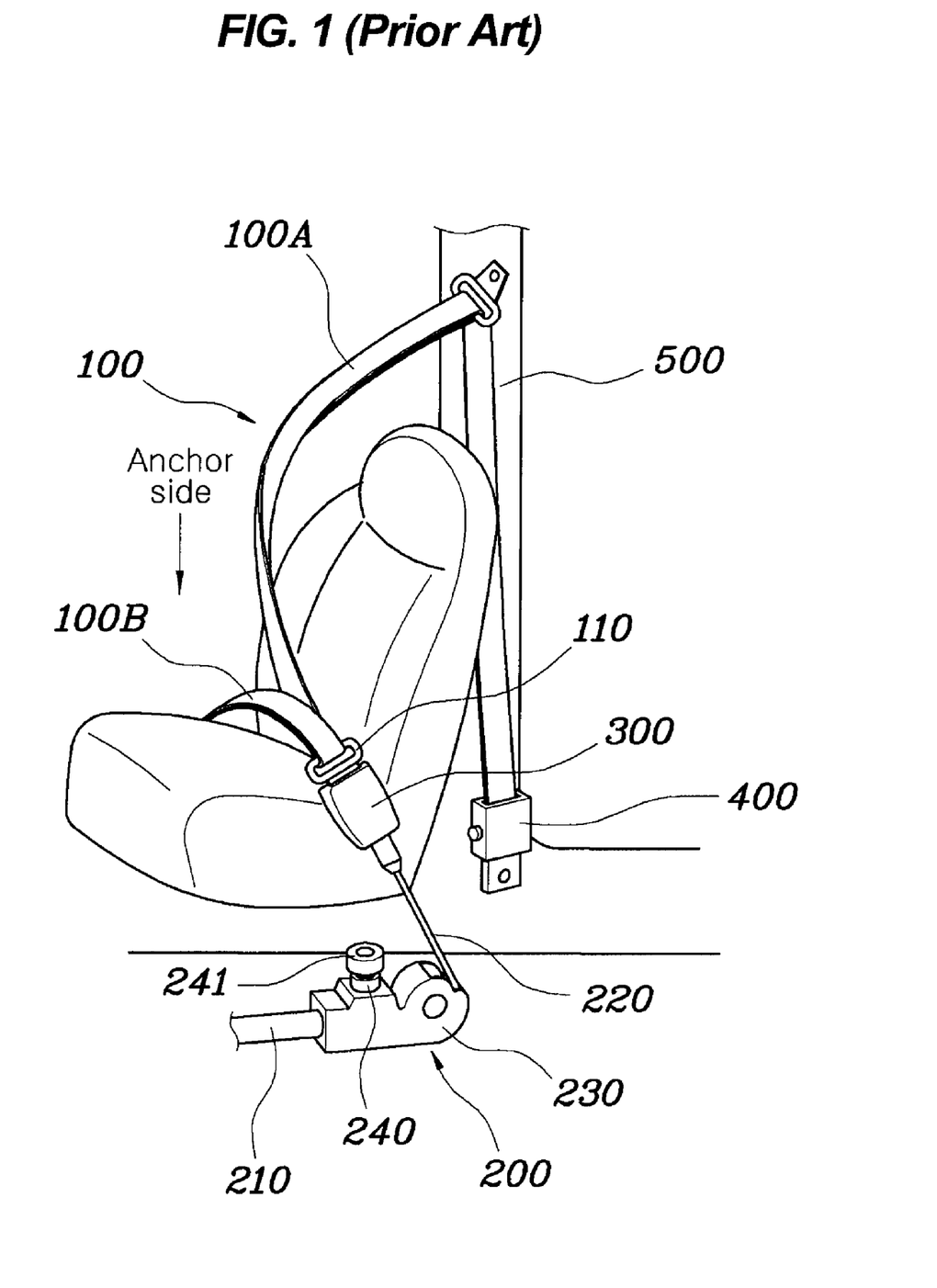
FIG. 1 is a perspective view illustrating a seat belt to which a conventional seat belt pretensioner is applied.

Referring to FIG. 1, a seat belt 100 is generally divided into an upper belt part 100A and a lower belt part 100B when viewed from a buckle tongue 110. The upper belt part 100A extends from the shoulder diagonally across the torso to the waist of a vehicle occupant, and the lower belt part 100B extends laterally across the hips to restrain the waist of the vehicle occupant. A conventional seat belt pretensioner 200 shown in FIG. 1 is installed adjacent to a buckle 300. The seat belt pretensioner 200 is connected to the lower belt part 100B through the engagement between the buckle tongue 110 and the buckle 300 to reduce the movement of the waist of the vehicle occupant in case of a crash.

The seat belt pretensioner 200 shown in FIG. 1 is disclosed in Japanese Unexamined Patent Publication No. 2003-146184. The seat belt pretensioner 200 is structured such that a piston (not shown) disposed in a cylinder 210 is connected with the buckle 300 by a wire 220, and a gas generator 240 is arranged in front of the cylinder 210 (in a direction facing the buckle 300). As the piston is fired rearward by the propellant gas generated from the gas generator 240, the wire 220 pulls the buckle 300 and tightens the lower belt part 100B. The gas generator 240 is installed to project vertically with respect to the cylinder 210 so as to avoid interference with the wire 220. In FIG. 1, the unexplained reference numerals 230, 241, 400 and 500 respectively designate a housing, a cap, a retractor, and a center pillar.

The conventional seat belt pretensioner suffers from a drawback in that, since the gas generator 240 is arranged in front of the cylinder 210, an area where the gas generator 240 is placed becomes structurally complicated, the number of parts increases, and the ease of assembly deteriorates. Also, the vertically projecting gas generator 240 interferes with surrounding parts such as a vehicle body, thereby serving as a factor that impedes the miniaturization of the pretensioner.

BRIEF SUMMARY OF THE INVENTION

Various aspects of the present invention are directed to provide a seat belt pretensioner in which a gas generator is arranged in line behind a cylinder so that the miniaturization and structural simplification of the pretensioner becomes possible.

In an aspect of the present invention, a seat belt pretensioner device may include a cylinder, a piston slidably disposed in the cylinder, a gas generator installed to rear end portion of the cylinder and configured to supply a propellant gas to the piston for moving the piston in a forward direction, a first direction conversion unit disposed between the gas generator and the piston and connected to the cylinder, and a coupling member for coupling a seat belt and the piston, wherein a portion of the coupling member is engaged with the first direction conversion unit so as to change a movement direction of the coupling member while the piston moves in the forward direction, and a reward movement restriction member configured to restrict a rearward movement of the piston while the piston moves in the forward direction by the propellant gas of the gas generator.

The seat belt pretensioner device may further include a guide member installed in the cylinder to receive a portion of the coupling member and to guide the movement direction of the coupling member while the piston moves in the forward direction.

The seat belt pretensioner device may further include a second direction conversion unit installed to a bracket connected to a front end portion of the cylinder and the other portion of the coupling member is engaged with the second direction conversion unit so as change the movement direction of the coupling member.

The second direction conversion unit may include at least a pulley rotatably coupled to the bracket and the pulley receives the other portion of the coupling member to change the movement direction of the coupling member.

The first direction conversion unit may include at least a pulley rotatably coupled to the cylinder and the pulley receives the portion of the coupling member to change the movement direction of the coupling member, wherein the coupling member is a wire.

The wire may include a first connection portion which is connected to the seat belt and a second connection portion which passes through the piston, is wound on the pulley, and is then fastened to the piston, wherein the wire has a first wire portion and a second wire portion which extend parallel to each other along the cylinder and wherein a guide member is installed in a front end portion of the cylinder and includes at least two receiving holes to receive the first wire portion and the second wire portion respectively so as to space the first and second wire portions with a constant distance therebetween.

The wire may include a single piece of wire which forms a loop at the first connection portion and both ends of which are fastened to the piston at the second connection portion, wherein both ends of the wire are wound on the pulley in opposite directions.

The wire may include one end which is connected to the seat belt and the other end which is wound on the pulley after passing through the piston in rearward, forward and rearward directions so that a loop is defined in front of the piston and is then connected to the seat belt, wherein, as the piston is fired and the loop is pulled in the forward direction, the seat belt is pulled in the rearward direction.

A gas guide may be disposed in front of the gas generator and has a rear opening which receives a front end of the gas generator and a plurality of gas passages which are branched from the rear opening and extend in the forward direction wherein the gas passages are aligned symmetrical in a horizontal and vertical axis in a cross-sectional view.

The cylinder and the gas generator may be arranged in line.

The reward movement restriction member may be formed in the piston, wherein the reward movement restriction member includes a roller groove formed in an outer surface of the piston, wherein a distance between the cylinder and an inner surface of the roller groove gradually decreases in the forward direction, and a roller disposed in the roller groove, wherein a front portion of the roller groove is narrower than a diameter of the roller.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIGS. 6A through 6D are views illustrating the gas generator of the seat belt pretensioner of FIG. 2, wherein

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A seat belt pretensioner in accordance with various embodiments of the present invention will be described with reference to FIGS. 2 through 7B. Generally, the seat belt pretensioner according to various embodiments is constructed such that a seat belt (not shown) and a piston 20 disposed in a cylinder 10 are connected with each other by a wire 40, and, when the piston 20 is fired forward by the propellant gas supplied from a gas generator 50, the wire 40 pulls the seat belt rearward.

Figure 2:
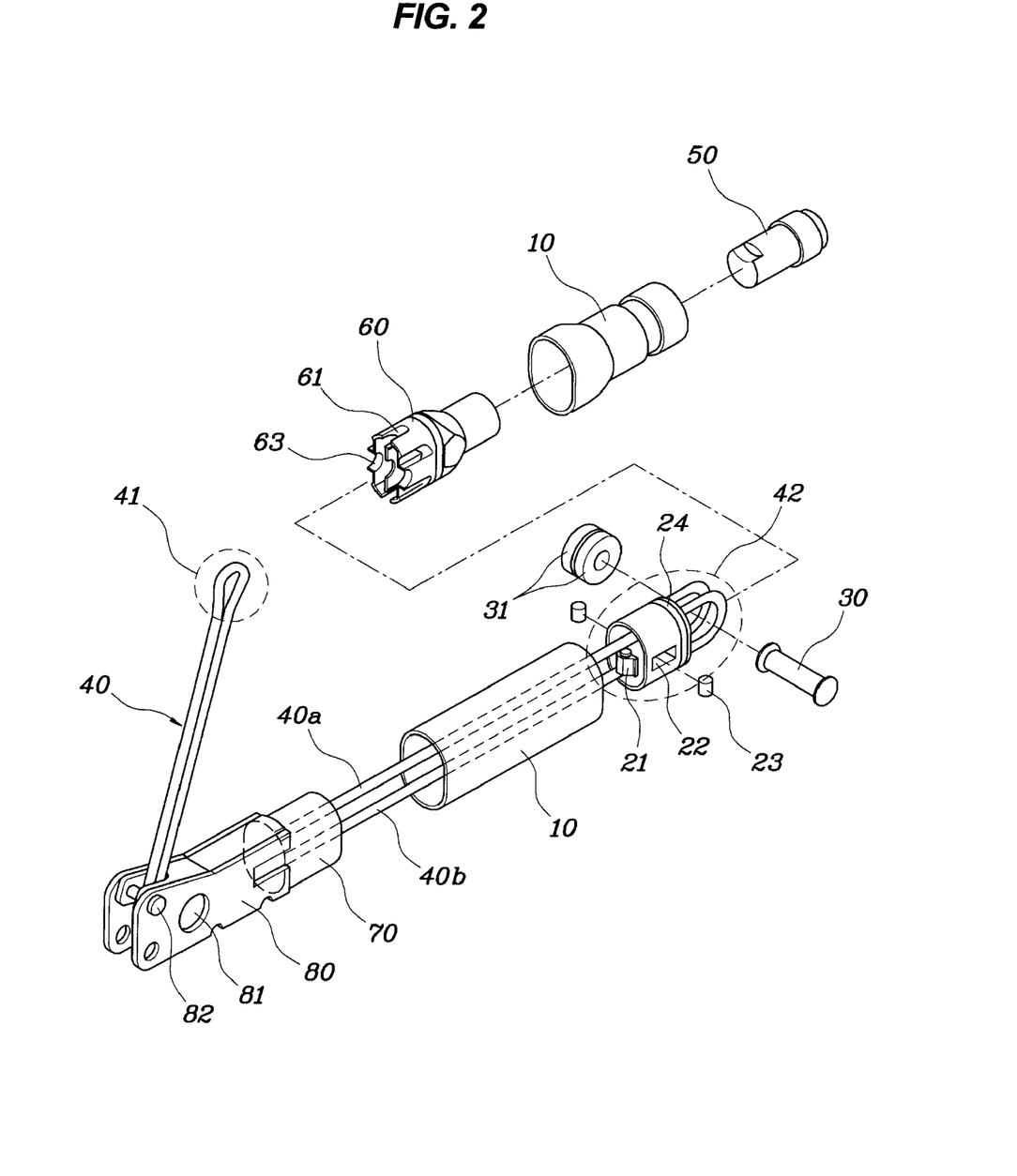
FIG. 2 is an exploded perspective view illustrating an exemplary seat belt pretensioner in accordance with the present invention.
Figure 3:
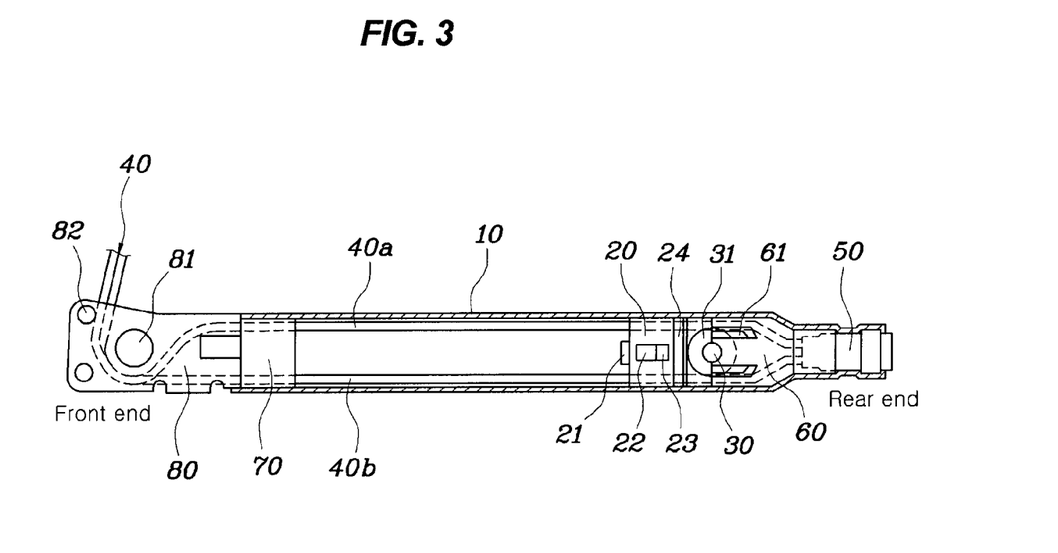
FIG. 3 is a side sectional view of the seat belt pretensioner of FIG. 2.

As shown in FIGS. 2 and 3, the cylinder 10 has a hollow configuration. A wire guide 70 is fitted into the front end of the cylinder 10 to prevent a first wire portion 40a and a second wire portion 40b of the wire 40 from becoming twisted and to hold them parallel to each other. The piston 20 is disposed adjacent to the rear end of the cylinder 10 to be movable in a forward direction. The gas generator 50 is fitted into the rear end of the cylinder 10, and a gas guide 60 is positioned in front of the gas generator 50 so as to allow the pressure of the propellant gas to be transferred to the piston 20 without leakage. A pin 30 is placed between the piston 20 and the gas guide 60 to extend in a diametrical direction of the cylinder 10.

A structure for installing or locating the wire 40 will be described with reference to FIGS. 2 through 4.

Referring to FIG. 2, a loop is formed on a first connection portion 41 of the wire 40. The first connection portion 41 is connected to the seat belt, specifically, the buckle of a lower belt part. Of course, in the case that the pretensioner is installed on the anchor side of the lower belt part, the first connection portion 41 may be connected to an anchor connector or may be directly connected to the lower belt part. A second connection portion 42 of the wire 40 passes through the piston 20, is wound on the pin 30, and is then fastened to the piston 20.

Figure 4:
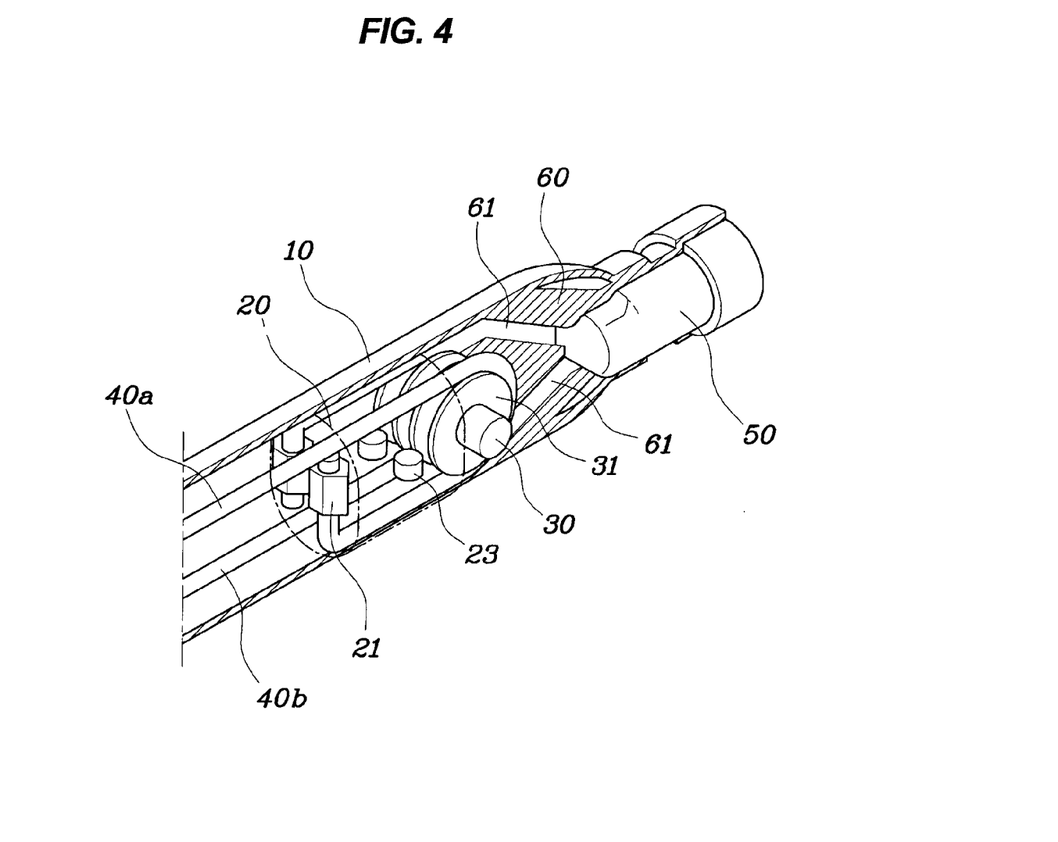
FIG. 4 is a partial broken-away perspective view schematically illustrating the structure of a rear end part of the seat belt pretensioner of FIG. 2.

Referring to FIGS. 3 and 4, the first wire portion 40a and the second wire portion 40b, which form loops at the second connection portion 42, pass through the wire guide 70 and the piston 20, and extend in parallel between the wire guide 70 and the piston 20 while being separated up and down from each other. The upwardly positioned first wire portion 40a passes through the right upper portion of the piston 20, is wound on the pin 30 in the clockwise direction (when viewed in FIG. 4), passes through the right lower portion of the piston 20, and is then fastened to the front surface of the piston 20 by a wire fastener 21. The downwardly positioned second wire portion 40b passes through the left lower portion of the piston 20, is wound on the pin 30 in the counterclockwise direction (when viewed in FIG. 4), passes through the left upper portion of the piston 20, and is then fastened to the front surface of the piston 20 by the wire fastener 21. The first wire portion 40a and the second wire portion 40b are placed symmetrically to each other.

Figure 7A:
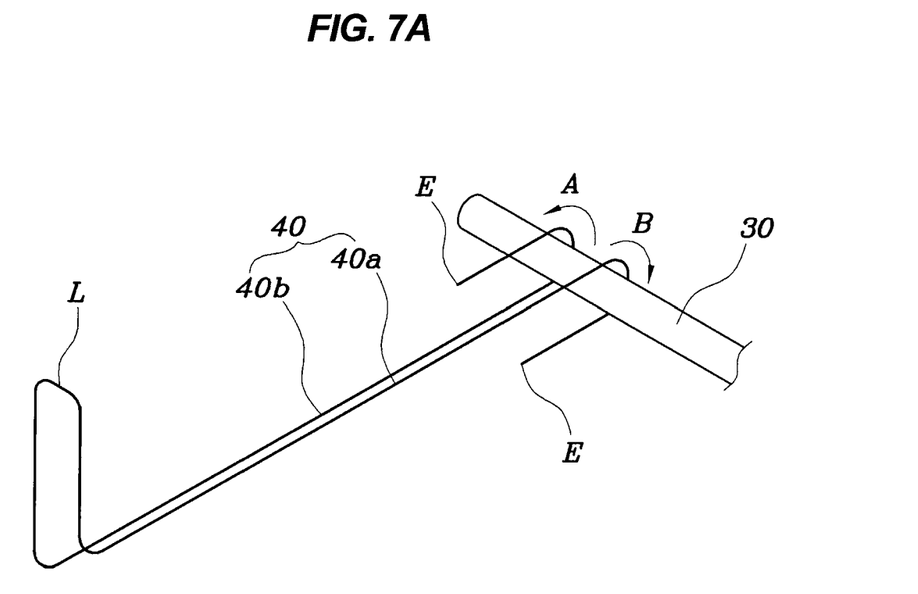
FIGS. 7A and 7B are conceptual views explaining the installation or the location of a wire in the seat belt pretensioner of FIG. 2.
Figure 7B:
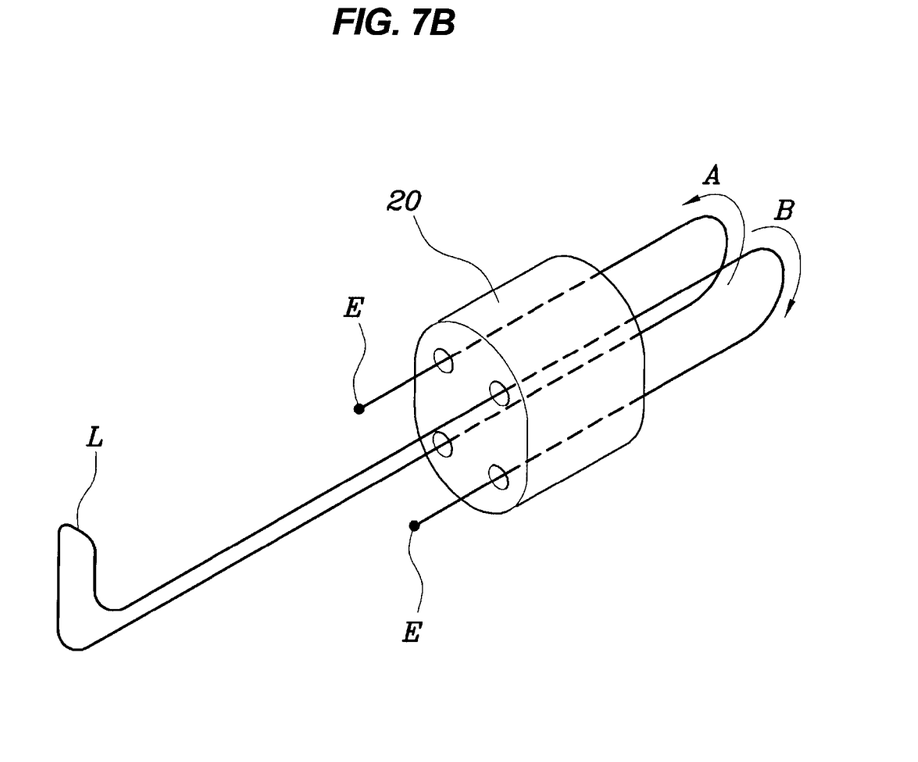

The structure for installing the wire 40 as described above can be clearly understood from the conceptual views of FIGS. 7A and 7B. First, as shown in FIGS. 7A and 7B, it is to be noted that the wire 40 is composed of a single piece of wire. The middle portion of the wire 40 is flexed and forms the loop L. Both ends E of the wire 40 are wound on the pin 30 in opposite directions (indicated by the arrows A and B) and are fastened to the piston 20. If the piston 20 to which both ends E of the wire 40 are fastened is pushed forward, as the loop L and both ends E of the wire 40 approach each other, the seat belt can be pulled rearward by the wire 40.

Figure 9:
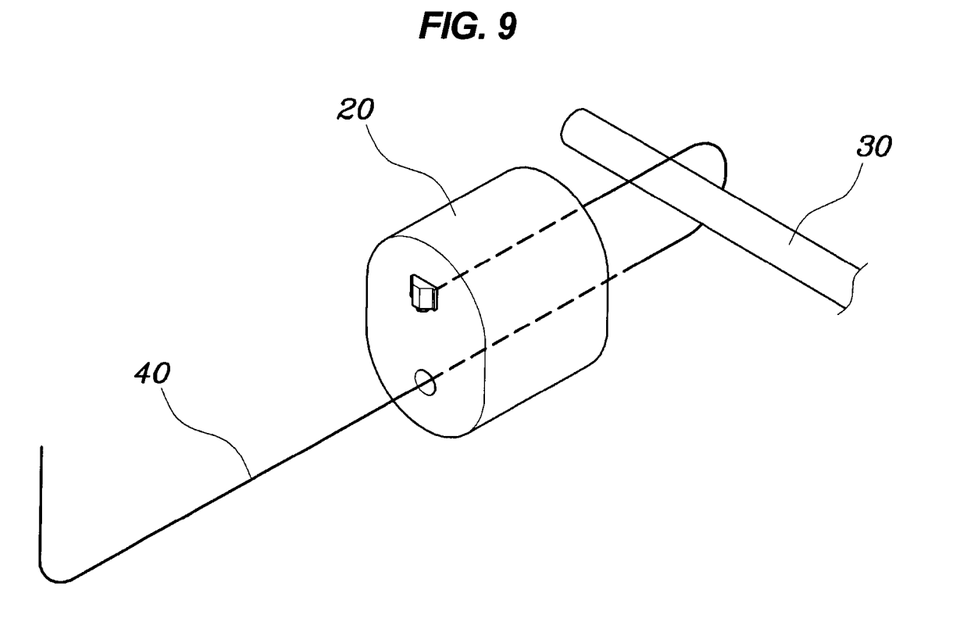
FIG. 9 is conceptual view explaining the construction of another exemplary seat belt pretensioner in accordance with the present invention.

Unlike the illustration of FIGS. 7A and 7B, it is to be understood that one of the first wire portion 40a and the second wire portion 40b wound on the pin 30 may be removed. That is to say, as shown in FIG. 9, it is conceivable that the front end of a single piece of wire 40 is connected to the buckle, and the rear end thereof passes through the piston 20, is wound on the pin 30 and is then fastened to the piston 20.

Meanwhile, as shown in FIG. 4, two pulleys 31 can be installed on the pin 30 to be rotated about the pin 30, and the wire 40 can be wound on these pulleys 31. The pulleys 31 allow the propellant force applied to the piston 20 to be transferred to the wire 40 without loss.

A restriction mechanism for restricting the rearward movement of the piston 20 will be described with reference to FIGS. 3 and 4.

The piston 20 should be moved only in the forward direction, and the rearward movement of the piston 20 should be restricted. The rearward movement of the piston 20 means a decrease in the force for the wire 40 to pull the seat belt, and this means in turn failure in restrang a vehicle occupant by the seat belt pretensioner. Therefore, the restriction mechanism for permitting the movement of the piston 20 only in the forward direction needs to be provided between the piston 20 and the cylinder 20.

In order to constitute the restriction mechanism, rollable elements such as balls and rollers are employed. In detail, as shown in FIG. 4, rollers 23 are interposed between the cylinder 10 and the piston 20. Roller grooves 22 are defined on both sides of the piston 20 on which the rollers 23 are provided, such that the depth of the roller grooves 22 gradually decreases in the forward direction. Due to this fact, if the piston 20 is moved rearward, the rollers 23 roll and move forward to be caught tight between the piston 20 and the cylinder 10, by which the rearward movement of the piston 20 is prevented. In FIG. 4, the piston 20 is illustrated by a single-dotted line.

The structure of the gas guide 60 will be described below with reference to FIGS. 5 and 6A through 6D.

Figure 5:
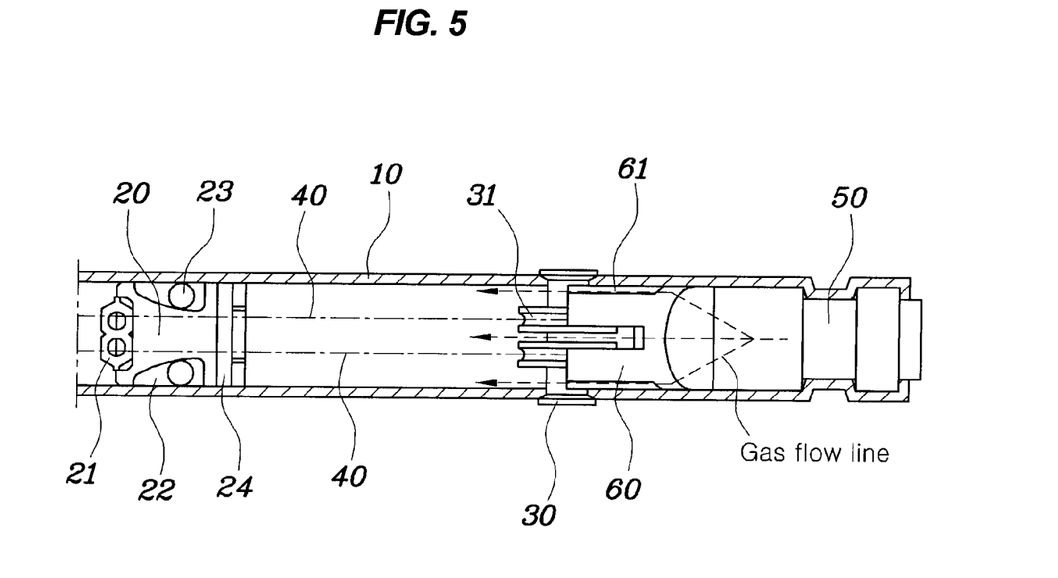
FIG. 5 is a transverse sectional view of the rear end part of the seat belt pretensioner of FIG. 2, showing the state in which a piston is moved forward by the propellant gas generated by a gas generator.

Referring to FIG. 5, the gas guide 60 is installed close to the pin 30 such that the propellant gas generated from the gas generator 50 can be quickly transferred to the piston 20. Elements are defined on the front end of the gas guide 60 in order to prevent interference with the pin 30, the pulleys 31 and the wire 40. The front end of the gas guide 60 is defined with pin receiving grooves 63 in the horizontal direction and wire receiving grooves 64 in the vertical direction.

Figure 6A:
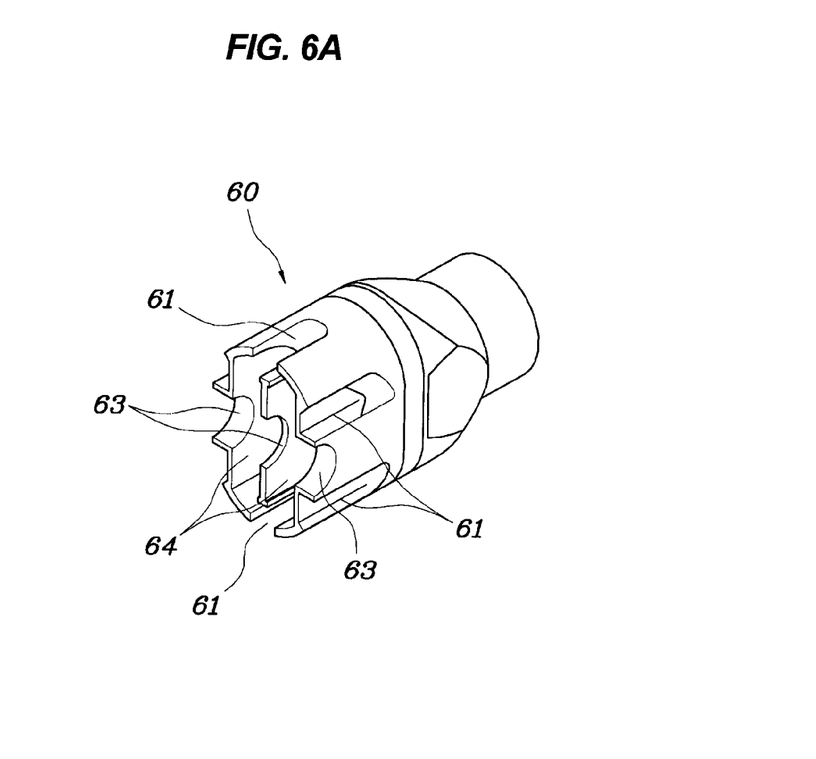
FIG. 6A is a perspective view.
Figure 6B:
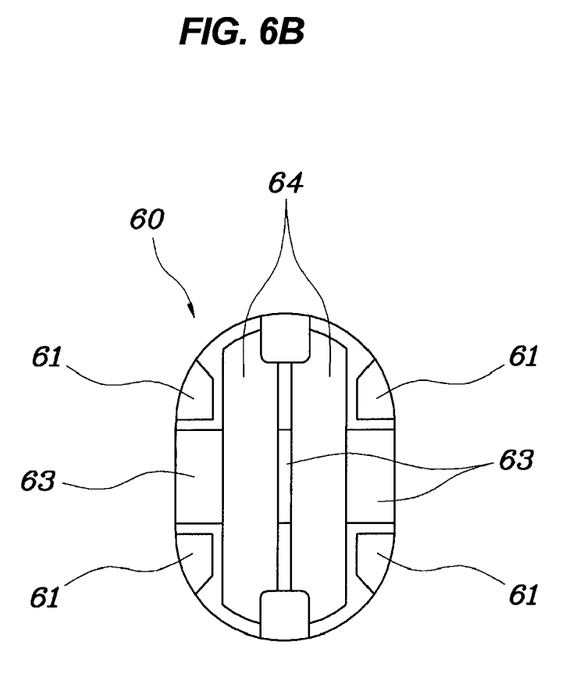
FIG. 6B is a front view.
Figure 6C:
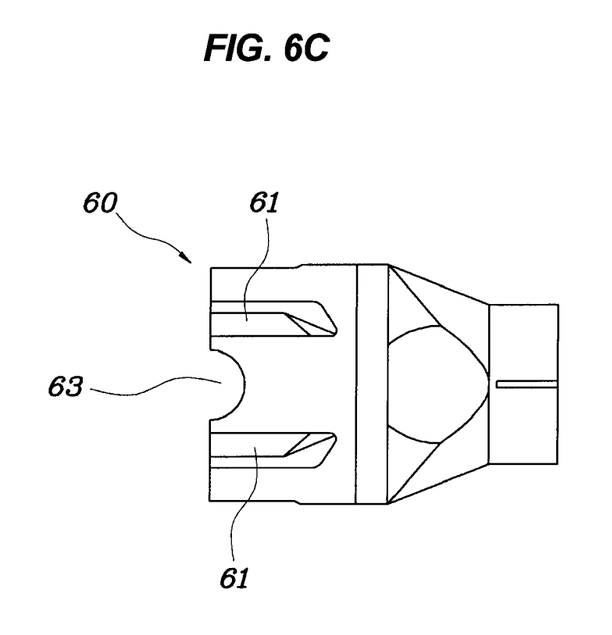
FIG. 6C is a side view.
Figure 6D:
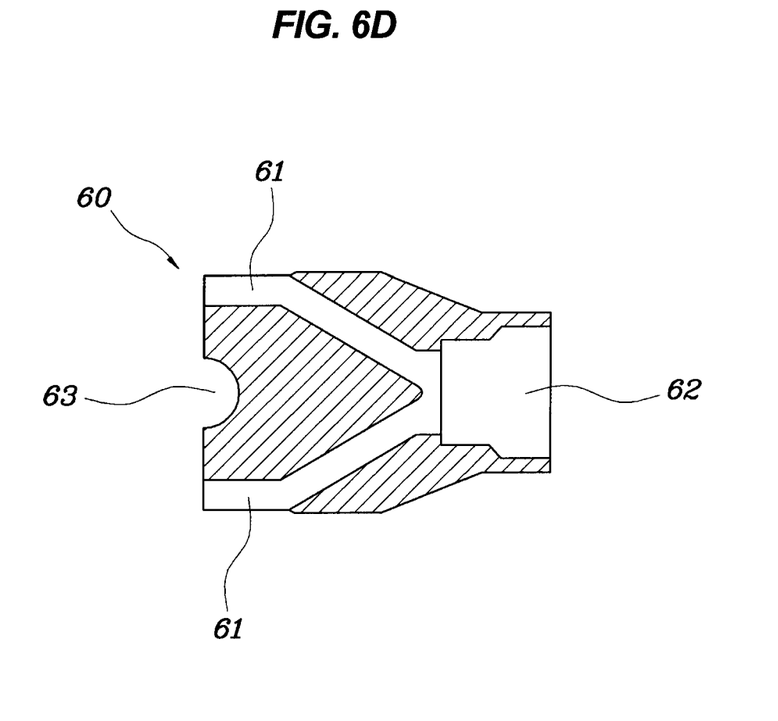
FIG. 6D is a sectional view.

Referring to FIGS. 6A and 6B, in addition to these grooves 63 and 64, gas passages 61 are defined on the front end of the gas guide 60 to allow the propellant gas from the gas generator 50 to be transferred to the piston 20 through bypassing the pin 30, the pulleys 31 and the wire 40. As can be readily seen from FIGS. 6C and 6D, these gas passages 61 branch from a rear opening 62 which is defined in the rear end of the gas guide 60 to receive the front end of the gas generator 50, in such a way as to extend in various directions. An O-ring 24 is placed on the rear end of the piston 20 such that the propellant gas supplied through the gas guide 60 does not leak through a gap between the piston 20 and the cylinder 10 (see FIG. 5).

Referring to FIGS. 2 and 3, a bracket 80 is provided in front of the wire guide 70. The wire 40 is bent upward in the bracket 80. In detail, the wire 40 is bent upward while passing between a first pin 81 and a second pin 82 which are secured to the bracket 80 in the horizontal direction. However, the bracket 80 is not an essential component. As the case may be, the wire 40 may not be bent upward and may be linearly connected to the seat belt. In particular, this is the case when the seat belt pretensioner is installed on the anchor side of the lower belt part.

Figure 8A:
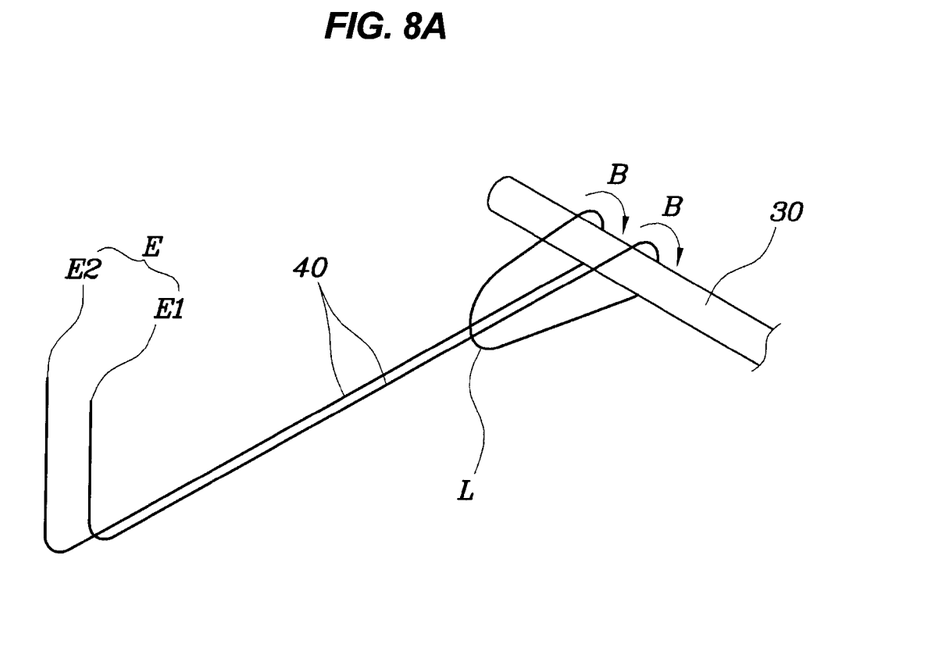
FIGS. 8A and 8B are conceptual views explaining the construction of another exemplary seat belt pretensioner in accordance with the present invention, specifically, the installation or the location of a wire.
Figure 8B:
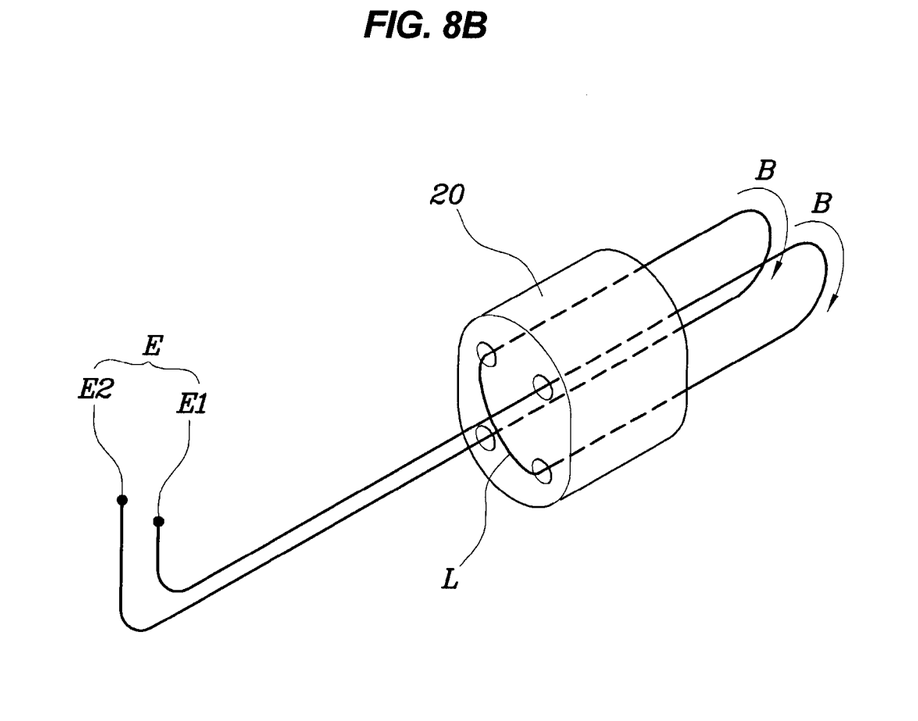

Referring to FIGS. 8A and 8B, another exemplary embodiment is different from the above-described embodiment in terms of the structure for installing or locating a wire. The other construction is essentially the same as that of the above described embodiment. According to this and other embodiments of the present invention, both ends E of the wire 40 are connected to the seat belt, and the loop L is formed in front of the piston 20 by the middle portion of the wire 40. In detail, one end E1 of the wire 40 is connected to the seat belt. The other end E2 of the wire 40 passes through the piston 20 in the rearward direction, is primarily wound on the pin 30, forms the loop L after passing through the piston 20 in the forward direction, is secondarily wound on the pin 30 by passing through the piston 20 in the rearward direction, and is then connected to the seat belt after passing through the piston 20 in the forward direction. The directions, in which the wire 40 is primarily and secondarily wound on the pin 30, are the same with each other as indicated by the arrows B.

Describing the wire installation structure according to various embodiments using the first connection portion and the second connection portion (see FIG. 2) as described above, both ends E of the wire 40 constitute the first connection portion which is connected to the seat belt, and the loop L is formed on the second connection portion of the wire 40 which is connected to the piston 20. If the piston 20 is moved forward by the pressure of the propellant gas generated from the gas generator 50 while pulling the loop L, as the distance between the first connection portion and the second connection portion is shortened, the seat belt is pulled rearward.

However, the present invention is not restricted to the structure including the first connection portion and the second connection portion that is coupled by the first and wire portion as aforementioned above. In further embodiments, the first connection portion and the second connection portion can be coupled by a single wire portion not to form a loop.

As is apparent from the above description, the seat belt pretensioner according to the present invention provides advantages in that, since a gas generator can be arranged in line behind a cylinder, the miniaturization and structural simplification of the seat belt pretensioner becomes possible.

Also, because the degree of freedom in designing the seat belt pretensioner increases, the number of parts can be decreased, and the ease of assembly and space utilization efficiency can be improved.

For convenience in explanation and accurate definition in the appended claims, the terms "front", "rear", "forwards" and "rearwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A seat belt pretensioner device comprising:
a cylinder;
a piston slidably disposed in the cylinder;
a gas generator installed to rear end portion of the cylinder and configured to supply a propellant gas to the piston for moving the piston in a forward direction;

a first direction conversion unit disposed between the gas generator and the piston and connected to the cylinder;

a coupling member for coupling a seat belt and the piston, wherein a portion of the coupling member is engaged with the first direction conversion unit so as to change a movement direction of the coupling member while the piston moves in the forward direction;

a reward movement restriction member configured to restrict a rearward movement of the piston while the piston moves in the forward direction by the propellant gas of the gas generator; and a second direction conversion unit installed to a bracket connected to a front end portion of the cylinder and the other portion of the coupling member is engaged with the second direction conversion unit so as change the movement direction of the coupling member.

2. The seat belt pretensioner device according to claim 1, further comprising a guide member installed in the cylinder to receive a portion of the coupling member and to guide the movement direction of the coupling member while the piston moves in the forward direction.

3. The seat belt pretensioner device according to claim 1, wherein the second direction conversion unit includes at least a pulley rotatably coupled to the bracket and the pulley receives the other portion of the coupling member to change the movement direction of the coupling member.

4. The seat belt pretensioner device according to claim 1, wherein the first direction conversion unit includes at least a pulley rotatably coupled to the cylinder and the pulley receives the portion of the coupling member to change the movement direction of the coupling member.

5. The seat belt pretensioner device according to claim 4, wherein the coupling member is a wire.

6. The seat belt pretensioner device according to claim 5, wherein the wire includes a first connection portion which is connected to the seat belt and a second connection portion which passes through the piston, is wound on the pulley, and is then fastened to the piston.

7. The seat belt pretensioner device according to claim 6, wherein the wire has a first wire portion and a second wire portion which extend parallel to each other along the cylinder.

8. The seat belt pretensioner device according to claim 7, wherein a guide member is installed in a front end portion of the cylinder and includes at least two receiving holes to receive the first wire portion and the second wire portion respectively so as to space the first and second wire portions with a constant distance therebetween.

9. The seat belt pretensioner device according to claim 7, wherein the wire comprises a single piece of wire which forms a loop at the first connection portion and both ends of which are fastened to the piston at the second connection portion.

10. The seat belt pretensioner device according to claim 9, wherein both ends of the wire are wound on the pulley in opposite directions.

11. The seat belt pretensioner device according to claim 4, wherein the wire includes one end which is connected to the seat belt and the other end which is wound on the pulley after passing through the piston in rearward, forward and rearward directions so that a loop is defined in front of the piston and is then connected to the seat belt, wherein, as the piston is fired and the loop is pulled in the forward direction, the seat belt is pulled in the rearward direction.

12. The seat belt pretensioner device according to claim 1, wherein a gas guide is disposed in front of the gas generator and has a rear opening which receives a front end of the gas generator and a plurality of gas passages which are branched from the rear opening and extend in the forward direction.

13. The seat belt pretensioner device according to claim 12, wherein the gas passages are aligned symmetrical in a horizontal and vertical axis in a cross-sectional view.

14. The seat belt pretensioner device according to claim 1, wherein the cylinder and the gas generator are arranged in line.

15. The seat belt pretensioner device according to claim 1, wherein the reward movement restriction member is formed in the piston.

16. The seat belt pretensioner device according to claim 15, wherein the reward movement restriction member includes:

a roller groove formed in an outer surface of the piston, wherein a distance between the cylinder and an inner surface of the roller groove gradually decreases in the forward direction; and a roller disposed in the roller groove, wherein a front portion of the roller groove is narrower than a diameter of the roller.

17. A vehicle comprising the seat belt pretensioner device according to claim 1.

* * * * *